United States Patent
Desappan et al.

(10) Patent No.: US 10,878,273 B2
(45) Date of Patent: Dec. 29, 2020

(54) DYNAMIC QUANTIZATION FOR DEEP NEURAL NETWORK INFERENCE SYSTEM AND METHOD

(71) Applicant: Texas Instruments Incorporated, Dallas, TX (US)

(72) Inventors: Kumar Desappan, Bangalore (IN); Manu Mathew, Bangalore (IN); Pramod Kumar Swami, Bangalore (IN); Praveen Eppa, Hyderabad (IN)

(73) Assignee: Texas Instruments Incorporated, Dallas, TX (US)

( * ) Notice: Subject to any disclaimer, the term of this patent is extended or adjusted under 35 U.S.C. 154(b) by 178 days.

(21) Appl. No.: 16/028,773

(22) Filed: Jul. 6, 2018

(65) Prior Publication Data
US 2019/0012559 A1    Jan. 10, 2019

(30) Foreign Application Priority Data

Jul. 6, 2017    (IN) .............................. 201741023782

(51) Int. Cl.
| | |
|---|---|
| *G06K 9/38* | (2006.01) |
| *G06K 9/62* | (2006.01) |
| *G06N 3/04* | (2006.01) |
| *G06N 3/08* | (2006.01) |
| *G06N 3/063* | (2006.01) |
| *G06K 9/46* | (2006.01) |

(52) U.S. Cl.
CPC .............. *G06K 9/38* (2013.01); *G06K 9/4628* (2013.01); *G06K 9/6232* (2013.01); *G06K 9/6273* (2013.01); *G06N 3/04* (2013.01); *G06N 3/0454* (2013.01); *G06N 3/0481* (2013.01); *G06N 3/063* (2013.01); *G06N 3/08* (2013.01)

(58) Field of Classification Search
CPC ........... G06N 3/04; G06N 3/10; G06K 9/4628
See application file for complete search history.

(56) References Cited

U.S. PATENT DOCUMENTS

| | | | |
|---|---|---|---|
| 2016/0328646 A1* | 11/2016 | Lin .......................... | G06N 3/08 |
| 2018/0046894 A1* | 2/2018 | Yao ........................ | G06F 7/483 |
| 2018/0350110 A1* | 12/2018 | Cho ..................... | G06N 3/0454 |

OTHER PUBLICATIONS

Brownlee, "How to Visualize Filters and Feature Maps in Convolutional Neural Networks" May 6, 2019 (Year: 2019).*
Seif, "Visualising Filters and Feature Maps for Deep Learning," May 14, 2019. (Year: 2019).*

* cited by examiner

*Primary Examiner* — Ross Varndell
(74) *Attorney, Agent, or Firm* — Brian D. Graham; Charles A. Brill; Frank D. Cimino (57) ABSTRACT

A method for dynamically quantizing feature maps of a received image. The method includes convolving an image based on a predicted maximum value, a predicted minimum value, trained kernel weights and the image data. The input data is quantized based on the predicted minimum value and predicted maximum value. The output of the convolution is computed into an accumulator and re-quantized. The re-quantized value is output to an external memory. The predicted min value and the predicted max value are computed based on the previous max values and min values with a weighted average or a pre-determined formula. Initial min value and max value are computed based on known quantization methods and utilized for initializing the predicted min value and predicted max value in the quantization process.

26 Claims, 10 Drawing Sheets

DYNAMIC QUANTIZATION FOR DEEP NEURAL NETWORK INFERENCE SYSTEM AND METHOD

CROSS REFERENCE TO RELATED APPLICATIONS

This application claims the benefit of Provisional Application No. 201741023782, filed in India on Jul. 6, 2017, the disclosure of which is fully incorporated herein by reference.

BACKGROUND

Technical Field

This disclosure relates to deep neural networks, and more particularly to quantization techniques for neural networks.

Description of Related Art

Deep neural networks (DNNs) are becoming more and more popular in mobile and embedded systems. Those systems are characterized by tight resource constraints in terms of performance, energy consumption, and memory capacity. Due to this, today's typical scenario for deploying DNNs to mobile systems is to train such DNNs in servers and perform only the inference in such systems. Therefore, it is imperative to reduce the inference cost of neural networks for widespread application of DNNs to mobile and embedded systems.

One of the most effective methods for reducing the inference cost of neural networks is to reduce the precision of computation. Recent research has demonstrated that inference of DNNs can be accurately done by using 8-bit or even narrower bit width representations for weights and activations, rather than conventional 32/64-bit floating-point numbers. In addition, there have been active studies that aim at further reducing the precision of both computation and values by aggressively quantizing the weights and/or activations for inference. Such aggressive quantization methods are promising in that they can achieve significant reductions in the execution time, energy consumption, and memory capacity requirement of neural networks during the inference by exploiting the benefits of dedicated hardware accelerators, e.g. NVIDIA P40 and P4 which support 8-bit integer arithmetic or Stripes which provides execution time and energy consumption proportional to the bit width. However, existing quantization techniques have limitations that can hinder practical application of such techniques into mobile and embedded systems. First, existing methods lack in supporting flexible trade-off between output quality and inference performance. Mobile and embedded systems often have stringent constraints in both resource and inference accuracy, which requires design space exploration for trade-off between output quality and inference performance. However, some of the existing approaches are not flexible enough to exploit such tradeoff relationship. For example, techniques that binarize weights suffer from a significant loss of output quality for deep networks, which cannot be applied if the target system allows a very small accuracy loss, e.g. 1%. Second, even if existing quantization techniques support such trade-offs, they require modifications to the target network to achieve good quantization quality and/or apply quantization to only part of the network. Due to this, such techniques may require significant effort at design time, which may eventually prevent widespread adoption of them.

Deep neural networks (DNN) are also used for several computer vision tasks such as image classification, object detection and image based semantic segmentation. DNNs are mostly composed of FIR filters (convolutions). The weights of these convolutions have to be learned. DNNs use machine learning techniques to learn the weights. These offline (training on CPU/GPU) machine learning techniques use floating point computations for improved accuracy. Once the learning is complete, it can be deployed in a device to apply what it has learned. This deployment is normally referred as inference of a trained model. The floating point computations are not cost and power efficient. These floating point computations can be substituted with fixed point computations (8 or 16 bit) without losing inference accuracy.

Figure 1:
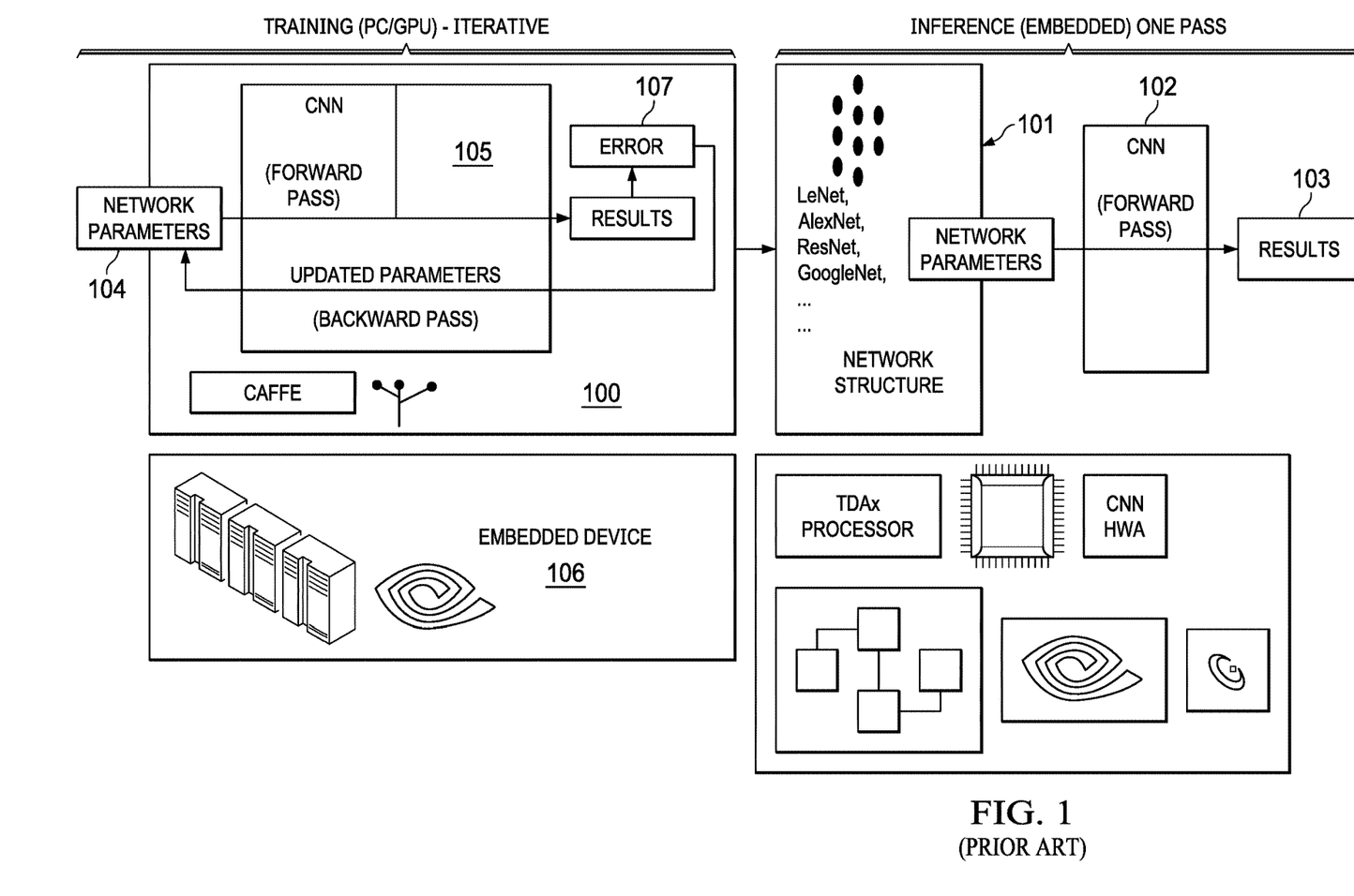
FIG. 1 illustrates a prior art learning framework for a deep learning training network.
Figure 2:
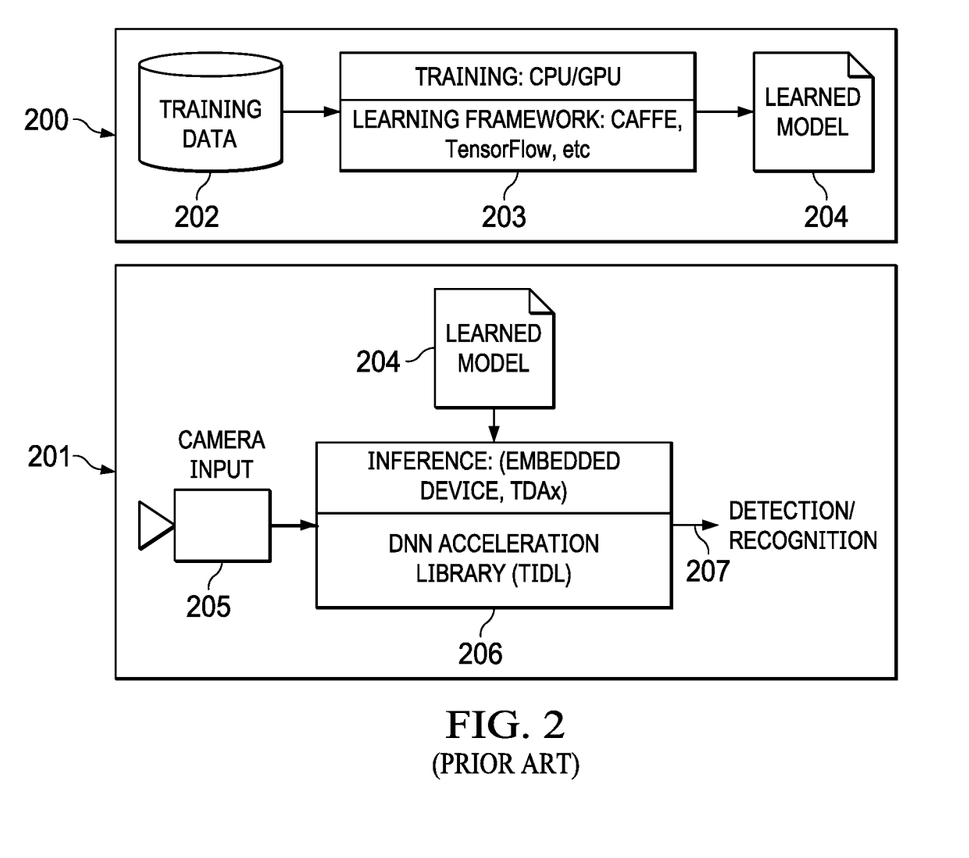
FIG. 2 illustrates a prior art deep learning training flow.

As described in FIG. 1 and FIG. 2 (200), an interactive training system for deep learning includes a convolution block (105) or convolution neural network (CNN) that performs convolution with training data (202) that includes data and labels of images. The iterative training framework (100) passes an image, and predicts the image based on the labels in the training data. Depending on the results of the prediction, an error (107) is computed and fed back to learn and update a network parameter (104). Each image is processed in multiple iterations to train and update the network parameter (104). Images may be crowd sourced from multiple users so that the training and training data encompasses multiple real time situations expected during inference. Labels are determined ahead of time, an image is compared with existing labels using "training time." A learned parameter called network parameter (104) is used during deployment, a CNN (105) is run and an image is predicted with a detection/recognition. Inference can run on an embedded device like a mobile or an automotive to predict objects such as a person in front of a car. Embedded devices (106) may be used to perform the inference and training. Network parameters (104) that are learned during training are weights for FIR filters during inference of an actual image. The network parameters are stored in a network structure (101) and used during inference. During training, floating point (32-bit) operations are used since the error has to be accurate and training has to be accurate. During inference, a fixed point computation is used. Fixed point (8-bit or 16 bit) uses fewer gates and less area on a chip, less power and less number of cycle compared to floating point computations. The training parameters are used in an inference with a CNN forward pass (102) and actual inference results (103) may be compared with real time observations for determining accuracy during inference.

Similar to FIG. 1 (100), FIG. 2 (200) illustrates a prior art flow chart for generating a learned model (204) with a trained data (202) and a training framework (203). The learned model (204) is further used in an actual inference as shown in FIG. 2 (201). When an image is captured with an image capturing device (205), an embedded device (206) running the inference receives the image and applies the parameters and weights from the learned model (204) to detect or recognize the image with a detection block (207). Designing an inference engine that can accurately detect and recognize images can present significant challenges due the number of compute operations needed and external memory bandwidth requirements.

SUMMARY OF THE INVENTION

According to one example aspect, this disclosure describes a method for dynamically quantizing feature maps of an image. The method includes computations such as convolution, inner product normalization of feature map data of an image based on a predicted maximum value, a predicted minimum value, trained kernel weights and the image data. The input data is quantized based on the predicted minimum value and predicted maximum value. The output of the convolution is computed into an accumulator and re-quantized. The re-quantized value is output to an external memory. The predicted min value and the predicted max value are computed based on the previous max values and min values with a weighted average or a predetermined formula. Initial min value and max value are computed based on known quantization methods and utilized for initializing the predicted min value and predicted max value in the quantization process.

DETAILED DESCRIPTION OF THE INVENTION

As used herein, "channel" may refer to a channel of a layer. For example, RGB (red, green, blue) may correspond to 3 channels for a layer. The words "min", "minimum", "Min", "Minimum" are interchangeably used herein, and may refer to a minimum value of a set of values. Similarly, "max", "maximum", "Max", "Maximum"" are interchangeably used herein, and may refer to a maximum value of a set of values. "Output image" and "output frame" are interchangeably used herein, and may refer to an image displayed on a screen. "Range" and "range statistics," as used herein, may refer to a difference of maximum value and minimum value from a set of values. For example, if the values of a set from a 2D image are 10, 12, 15, 9, 30, 80, 100, −5, −10, the min value of the set is −10, the max value of the set is 100, and the range of the set is 110. "Input image" and "input frame" are interchangeably used herein after to indicate an image captured by a camera. The terms "scaling", "scaling data" as used herein is a multiplication or division factor applied to a data. For example a data value of 10 is scaled to a value of 40 with a scaling factor of 4.

Figure 3:
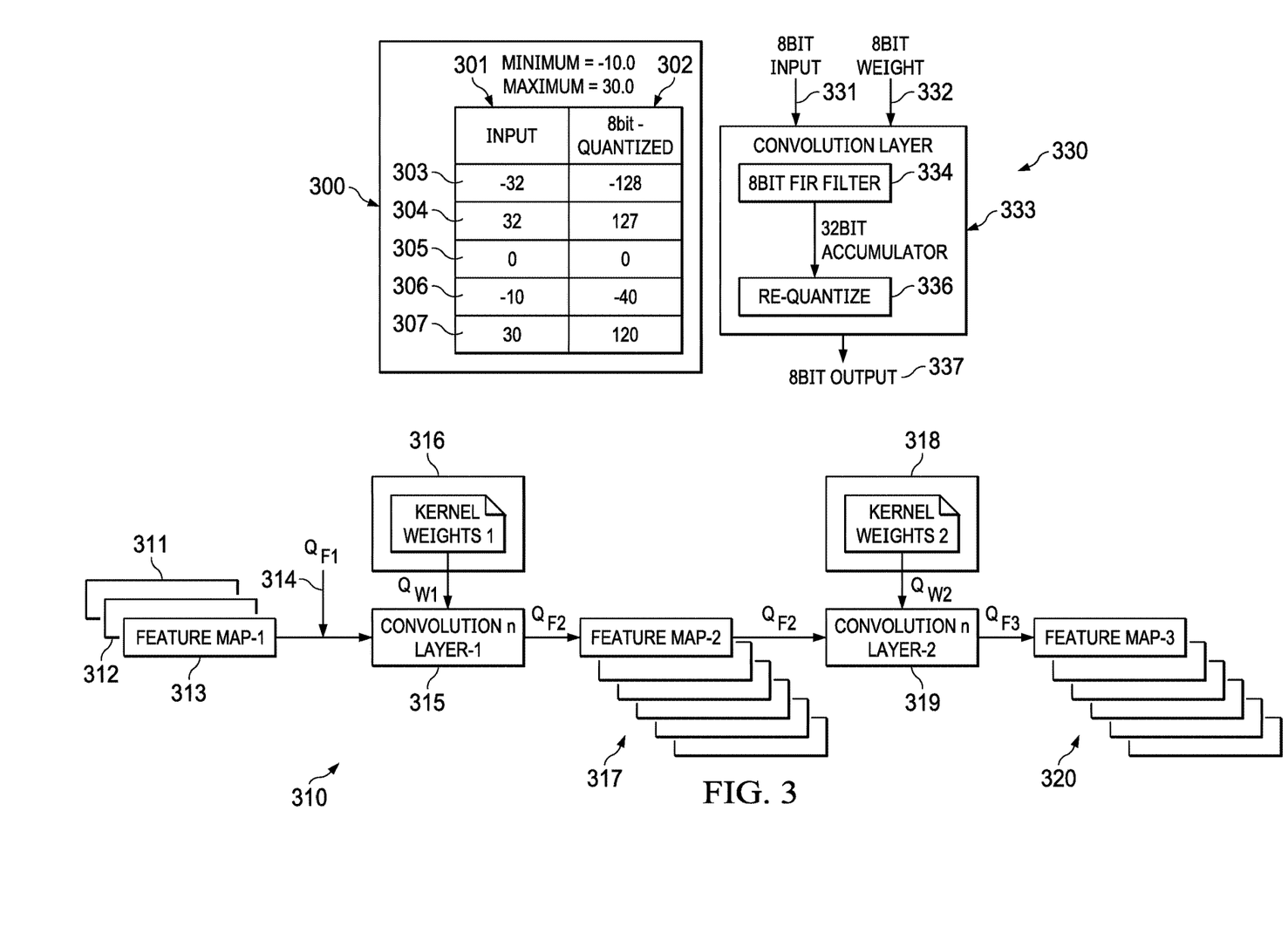
FIG. 3 depicts a fixed power of two quantization system.

FIG. 3 shows a table 300 with input data (301) that is quantized to data (302) with a power of 2 quantization method. A unique range (Power of two) and step size for each kernel weight and feature map are selected based on the global statistics collected during the training described in FIG. 1 and FIG. 2. Since the power of 2 range is used for both kernel and weight, a simple shift is sufficient to convert the output bit-width of the 32-bit accumulator to the output bit depth (8 or 16 bit). This shift value for each convolution layer may be decided during training time, so the 32-bit accumulator is converted to lower bit depth (8 or 16 bit) before store it in external memory.

However, since the power of two ranges are used, the complete range is not fully utilized. In the table (300) shown, only 160 steps are used out of total possible 256 steps (8 bits), the rest of the numbers are not used and therefore the entire range is not fully utilized which results in an accuracy loss. In the example, a scaling factor of 4 is utilized. In row (305) 0 is represented as 0, row (303) −32 represented as −128, and in row (304) 32 is represented as 127 In the example, power of 2 uses a scale of 4 with row (306) representing the minimum input value −10 that is quantized as −40, row (307) representing the maximum input value 30 that is quantized as 120 and therefore the number of steps is 160 (−40 to 120). The full global range (256) possible is not utilized and limited by the training max min. Since the scaling factor is a power of 2, a shift can be performed without multiplication or division. The scaling factors are selected during training time. During training all the values are evaluated to determine the max value and min value and determine a scaling factor for quantization. Max may be determined as a maximum of all the maximums, min is determined as a minimum of all the minimums and a global range is the difference of the max and the min. This generic solution may not generalize well and the quantization noise is high due to the global range. For example, if the min and max are −48 and 60 during inference, and if the same quantization from training with −10 as min and 30 as global max is used, a saturation effect may happen wherein all data below −10 will be represented as −10 even if the min could have been −32 based on the output levels. If a data such as −40 is received, it will be limited to −32. There will be considerable loss of accuracy due to the saturation effect. Accuracy loss because of reduced range usage is considerable. To moderate this effect, the model may be need to be fine-tuned with quantization. This may involve change in the training framework. A fine tuning may be used to reduce the accuracy loss. For example, in 100 training runs, the first 90 could be with floating point input where the max and min are determined and the input is quantized with the scaling factor. After quantization is locked the next 10 training runs are performed with fixed point to fine tune with a feedback until the accuracy loss is reduced. In the forward pass, for example in FIG. 1, the quantization for 90 training runs is performed with floating point and a fixed point training is performed for 10 training runs for the fine tuning.

Block (330) of FIG. 3 describes a 8-bit input (331) and a 8-bit weight (332) input to convolution block (333) that includes a 8-bit filter (334) and a re-quantizer (336). The convolution block outputs an 8-bit output (337) from the re-quantizer block (338). One scaling factor may be applied for input (8-bit) and one scaling factor for kernel (8-bit) followed by convolving and accumulating (32-bit). The accumulator may be 32 bits due to multiplication which needs to be re-quantized to make it a 8-bit value since the input is a 8-bit value and output is a 8-bit value.

FIG. 3 illustrates a typical deep neural network (DNN) 310 for image classification and includes some number of convolutional and subsampling layers to extract image features followed by one or more fully connected layers as used in traditional neural networks to perform classification based on the extracted features. The input to the initial convolution layer (315) is typically a m×n×r image where m is the height of the image, n is the width of the image, and r is the number of channels, e.g., for an RGB image, r=3. For example, layers (311), (312), and (313) may correspond, respectively, to the individual RGB channels for an input image of convolution layer (315). The kernel weights (316) may be input to the convolution layer along with scaling factors (314) for each layer of the feature map. The output of convolution layer (315) is a set of feature maps (317) which are the input to the next layer (319) in the DNN. Similarly, the output of convolution layer (319) is a set of feature maps (320) which are the input to the next layer (not shown) in the DNN. Kernel weights (318) are input to the convolution layer (319) along with feature map data (317). In one example, the number of convolutions may range from 1 to 1000. It should be noted that kernel weights and scaling factors for each layer are stored after training and used during inference convolution.

Each convolution layer includes some number of filters, the size and number of which may be different for each layer. Further, the filters may differ across the input feature maps. The coefficients or weights of the filters are determined by training the convolution neural network (CNN) with a set of training images. The trained filters act as feature detectors from the original input image. In the initial convolution layer, each filter of the layer is convolved with the image to produce a feature map corresponding to each filter. In subsequent convolution layers, filters are convolved with corresponding feature maps to produce a feature map corresponding to each filter.

Figure 4:
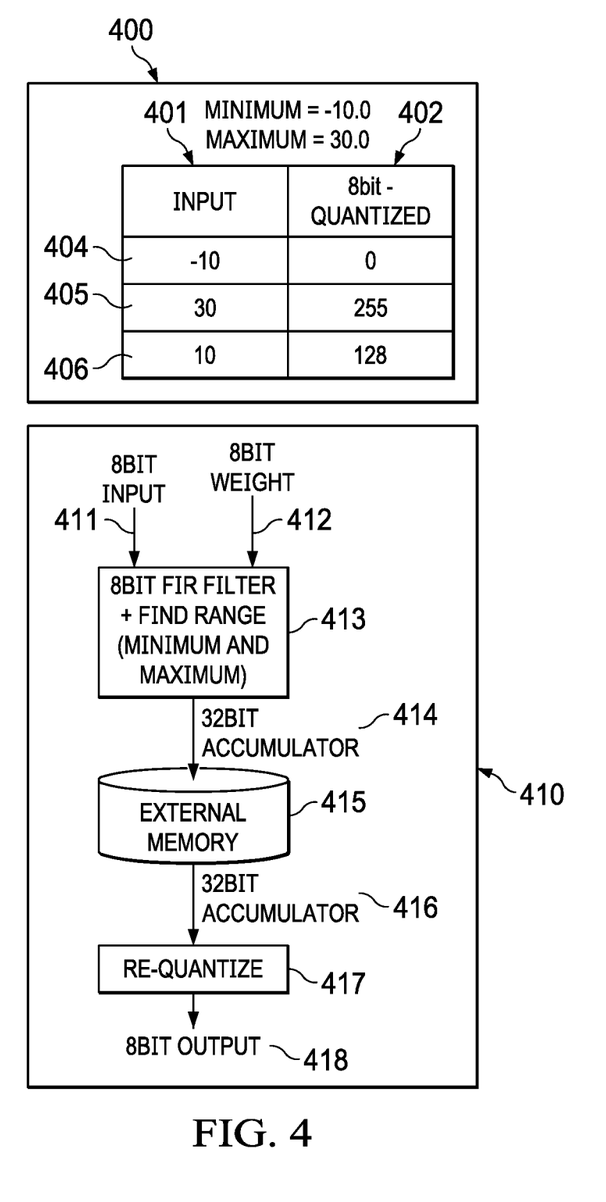
FIG. 4 depicts a dynamic quantization system utilizing the full range of the input.

FIG. 4 depicts a dynamic quantization system for quantizing input data of a feature map. FIG. 4 shows an example of a table 400 with input data (401) that is quantized to data (402) with a dynamic quantization as described below. With an offline method, a unique range and step size for each kernel weight is determined for final trained models. After finding min and max for floating point weights, the min is shifted to zero so that the entire range becomes positive. If min is negative, the min is shifted to zero so that the entire range becomes positive by adding an offset. The range is quantized with eight bits (Unsigned) by mapping the min to 0 and max to 255 for an 8-bit quantization. A shift cannot be used like the power of two quantization described above in FIG. 3, a multiplication is required in this case as it is not a power of two. Negative and positive scaling is used −127 to 127 for 8-bit. Generally, during inference in real time there are a small range of negative numbers and most numbers are positive. Therefore, shift all the negative numbers and add more levels with only positive numbers. In the table 400, min input row (404) value −10 is mapped to 0 and max input row (405) value 30 is mapped to 255, row (406) 10 value is mapped to 128 with an 8-bit quantization. The min and max values are computed dynamically during inference. The scale factor, min, and max are different for each layer and each weight. Feature maps may also be quantized similar to kernel weights, but this is performed on-the-fly. The offset subtraction to the input can be avoided and can be handled on the output of convolution (Subtracting a fixed value based on the offset and kernel). Range (min and max) is computed first on the output (signed 32 bit value) and the same is quantized to 8 bit unsigned value similar to the kernel weights. "Quantize" and "re-quantize" are interchangeably used herein, and may refer to quantization of input feature maps or kernel weights.

The advantages of this method are utilization of full range for both kernel weights and feature maps. The accuracy drop is small, so there is no need for fine-tuning model or change in training frame work. However, the minimum and maximum of filter accumulator across all the output channels needs to be computed. Memory requirements of these feature maps are very high (Few to 10s of Mega bytes) which cannot be accommodated in the on chip internal memory before performing the re-quantization. So the 32-bit accumulator values need to be stored in external memory. This increases the external memory requirement by 4× or 4 times. An amount of data such as 5 GB to 20 GB may be used per second in real time. A 4× access to external memory slows down the system in embedded platform, in addition to DDR access being power intensive. Even though the compute is faster with an 8-bit quantization, re-quantization may use floating point as division. The re-quantization step may use multiplication and a floating point division. Therefore, there is a need for quantization without the burden of excessive external memory access.

Also illustrated in FIG. 4 is a dynamic quantization block diagram 410 that includes a convolution block (413) with an 8-bit feature map input (411), an 8-bit weight (412) and a 32-bit accumulator output (414). A min and max may be determined on the input data and quantized as described above with respect to table (400). The 32-bit accumulator output (414) is written to an external memory (415) for each layer of the feature map. The 32-bit value for each layer is read back after all layers are convoluted and processed. The read value (416) from the external memory is re-quantized (417) to generate an 8-bit output (418).

Figure 5:
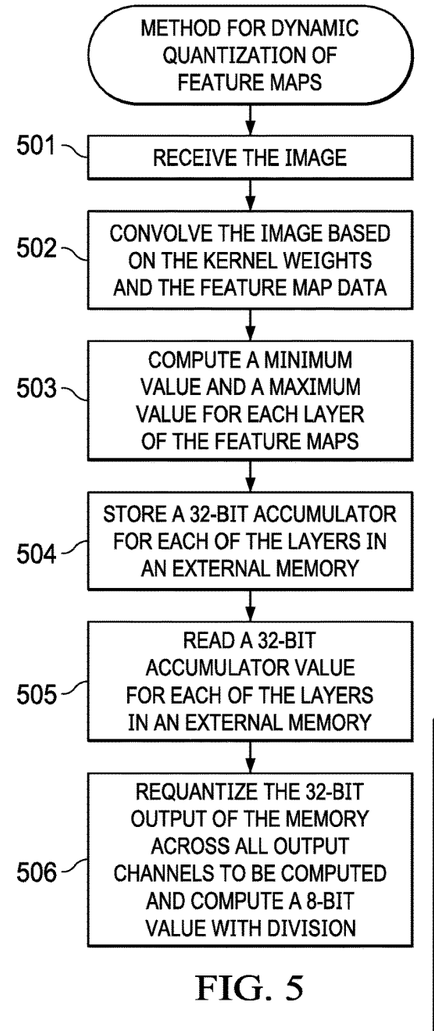
FIG. 5 is a flow chart depicting a dynamic quantization method utilizing the full range of the input.

As generally seen in the flow chart of FIG. 5, a method for dynamic quantization of feature maps in an image may be generally described in terms of the following steps:
1. receiving and processing an image (501);
2. convolving the image based on the kernel weights and the image data (502);
3. computing a Min Value and a Max Value of the feature map of the image for each layer of the feature map (503);
4. storing a 32-bit accumulator value for each of the layers in an external memory (504);
5. reading a 32-bit accumulator value for each of the layers from the external memory (505); and
6. re-quantizing the 32-bit output of the memory across all output channels to be computed and computing an 8-bit value with a division (506).

Figure 6:
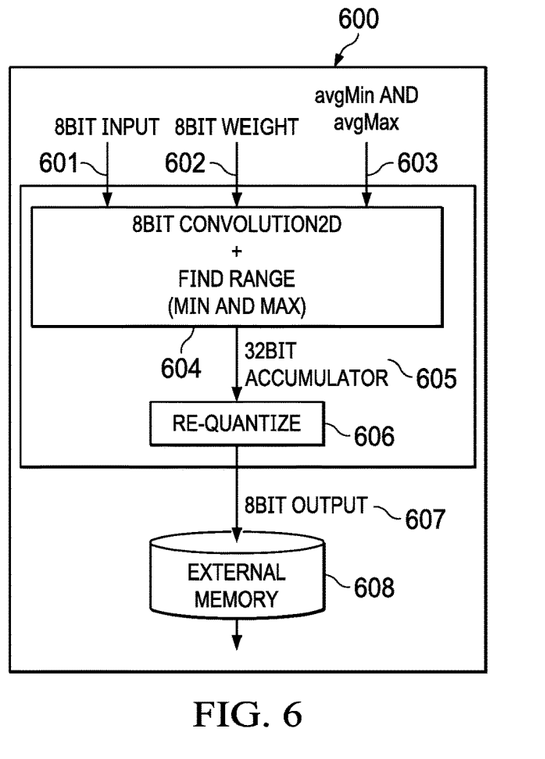
FIG. 6 illustrates an exemplary signal flow diagram for dynamic quantization, according to one aspect of the present invention.

FIG. 6 depicts an exemplary signal flow diagram 600 for dynamic quantization of feature maps in an image. During an inference process, a convolution block (604) receives an 8-bit input (601) of the feature map, an 8-bit weight (602) and a predicted min value and max value (603). The output (605) may be stored in a 32-bit accumulator. It should be noted that even though the inputs are represented as 8-bit, any number of bits ranging from 4-32 may be used to represent the input. Similarly, the output value may be represented any number of bits ranging from 4-32. The inference can run on an embedded device like a mobile or an automotive to predict objects such as a person in front of a car. The output of system for any arbitrary input signal can be constructed based on the impulse response of system as illustrated below. The impulse response is based on kernel weights.

The convolution can be used on image as well as text. For an image, an area of pixels may be convolved, while for text, a chain of characters or words may be convolved. In both cases, convolution is aimed to extract the important part of the data. The convolutional neural network may be used for image classification, video analysis, text classification and reinforcement learning for board game and video game. A camera (not shown) may receive an image and the input values of the feature map of the image may be processed, for example into a two dimensional or a three dimensional array. The image data may be processed in an embedded device. According to a preferred exemplary embodiment, the input data is represented as an 8-bit value. According to another preferred exemplary embodiment, the input data is represented as a 16-bit value. According to yet another preferred exemplary embodiment, the input data is represented with 4 to 32 bits. The kernel weights (602) may be an 8-bit value that may be determined during training as explained with respect to FIG. 1. In some instances, the kernel weight is represented with 4 to 32 bits. The kernel weights may be stored in an internal memory and input to the convolution block (604) during inference. In some instances, the kernel weights are stored in an external memory accessible through a memory interface. Kernel weights for each layer of the feature map may be maintained and stored in a memory. During inference, for each layer, kernel weights may be utilized for the impulse response and convolved with the input data of the feature maps and an output may be generated that is registered in an accumulator. Since the convolution operation is a multiple and addition operation, the number of bits in the accumulator may be more than the size of the input bus. For example, if the input data is an 8-bit number and the kernel weights are 8-bit numbers, the size of the output may range from 8-bits to 16-bits. The output stored in the accumulator (605) may be re-quantized in a re-quantization block (606) to an 8-bit output (607) which may be stored in an external memory (608). It should be noted that the output of convolution layer is a set of feature maps which are the input to the next convolution layer in the DNN. Similarly, the output of the next convolution layer is a set of feature maps (320) which are the input to the next layer in the DNN. Kernel weights are input to the convolution layer along with feature map data. The number of convolutions layers may range from 1 to 1000.

The convolution block (604) may also include a processing block (not shown) that computes a min value and a max value of the set of the input values and stores the values in a current min value register and a current max value register respectively. The current min value and the current max value may be stored for each image received and stored for further processing and inference of images to be received. Another general purpose processing block (not shown) may compute and update a predicted min value and a predicted max value based on the calculated current min value and current max value. The calculated current min value and current max value may then be stored as a previous min value and a previous max value which may be further used for computing predicted min value and predicted max value of future images that are to be received for inference. A plurality of previous min values and max values may be stored and maintained for each layer, each feature map and for each image received. According to an exemplary embodiment, the current min value and current max value, the previous min values and max values may be used to compute an updated predicted min value and an updated predicted max value. According to an exemplary embodiment, the predicted min value, the predicted max value, current min value, current max value, initial min value and initial max value are fixed point numbers comprising bits ranging from 4 to 16. According to another exemplary embodiment, the predicted min value, the predicted max value, current min value, current max value, initial min value and initial max value are fixed point numbers comprising 32 bits. According to a more preferred exemplary embodiment the predicted min value, the predicted max value, current min value, current max value, initial min value and initial max value are fixed point 8 bit numbers. According to another an exemplary embodiment wherein the predicted min value, the predicted max value, current min value, current max value, initial min value and initial max value are signed integers. According to yet another exemplary embodiment wherein the predicted min value, the predicted max value, current min value, current max value, initial min value and initial max value are unsigned integers The predicted min value and the predicated max value are used for quantizing input values instead of the current min value and current max value of the input across, in some examples, all layers of the input. During an inference, the input values for a feature map may be quantized with a range based on a predicted min value and a predicted max value without the need for computing a current min value and a current max value before re-quantizing. Therefore, the processing of all layers for each feature map is not required to determine a current min value and current max value for quantizing the input values of the feature map or the accumulator output. According to a preferred exemplary embodiment, the dynamic quantization of the input values with a predicted min value and a predicted max value avoids undesired and expensive memory cycles to write and read. As seen in the prior art dynamic quantization, a 32-bit accumulator value is written to a memory and read back when all the layers are processed to determine a current max value and a current min value. The minimum and maximum of the filter accumulator across all the output channels needs to be computed. Memory requirements of these feature maps are very high ranging from a 10s of Mega bytes and therefore cannot be stored in the on-chip internal memory before performing the re-quantization. So, the 32-bit accumulators needs to be stored in external memory. This increases the external memory requirement by at least 4 times access and therefore slows down the system in embedded platform. Furthermore, since DDR or external memory access is power intensive and the power requirements for the embedded device is increased by four times. Current embodiments provide a solution to the memory access problem by utilizing a predictive min value and a predictive max value without the need for an external memory access. In some instances, the memory access method of determining the current min and current max value may be used to initialize the predicted min value and predicted max value of the first image received. This method of initialization creates a memory burden on the first image only and subsequent quantization may be performed based on the predicted max value and predicted min value.

Figure 7A:
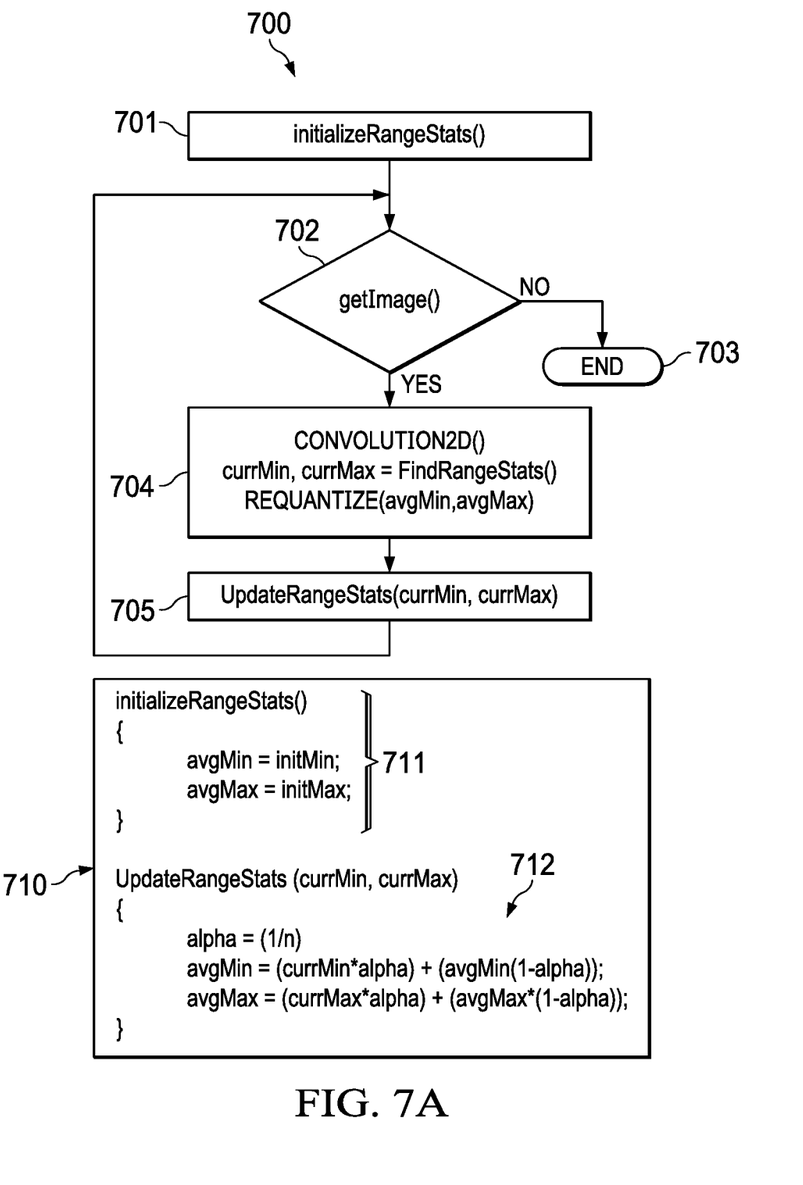
FIG. 7A illustrates an exemplary method flow chart for dynamic quantization, according to one aspect of the present invention.

As generally illustrated in FIG. 7A a pseudo code for computing the predicted min value and predicted max value may include the steps of initializing range statistics (701) with an avgMax value and an avgMin value; receiving an image (702), convolving the image, finding a current min value and a current max value of the image and quantizing the input (704); and updating (705) the predicted min value ("avgMin") and predicted max value ("avgMax") based on the current min value ("currMin") and current max value ("currMax") computed in step (704). The pseudo code may end (703) when no image is received. The process of computing and updating the avgMin and avgMax is illustrated in the pseudo code (710) which includes an initialization routine (711) and an update range statistics routine (712). According to an exemplary embodiment, the predicted Min Value is computed based on an average of the previous Min Values and the predicted Max Value is computed based on an average of the previous max Values. In some examples, the average may be an exponential moving average of the previous or current Max Values or Min Values. According to a more preferred exemplary embodiment wherein the predicted Min Value is computed based on a weighted average of the previous Min Values and the predicted Max Value is computed based on a weighted average of the previous max Values. According to another exemplary embodiment the predicted Min Value is computed based on a formula applied on the previous Min Values and the predicted Max Value is computed based on a formula applied on the previous max Values. The initialization routine (711) further includes initializing the avgMin and avgMax with an initial min value and an initial max value respectively. The initial min value and an initial max value may be determined based on any one of three methods described below or a combination thereof.

Figure 7B:
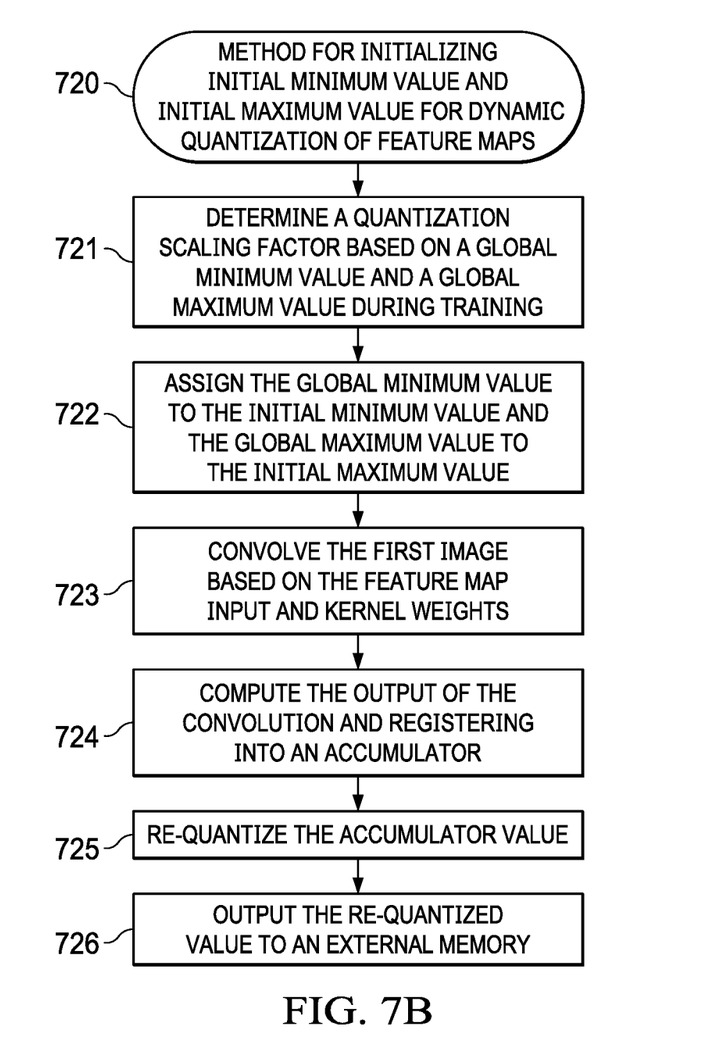
FIG. 7B is a flow chart illustrating a first technique for initializing the min value and max value according to one aspect of the present invention.

FIG. 7B (720) illustrates a first method of initializing the min value and max value comprising several steps. The first step in the method determines a quantization scaling factor based on a global min value and a global max value during training (721) followed by the step assigning the global min value to the initial min value and the global max value to the initial max value (722). The method in step (723) convolves the first image based on the feature map input and kernel weights followed by computing the output of the convolution into an accumulator in step (724). The method then proceeds to re-quantizing the accumulator value in step (725). Finally in step (726), the method outputting the re-quantized value to an external memory).

Figure 7C:
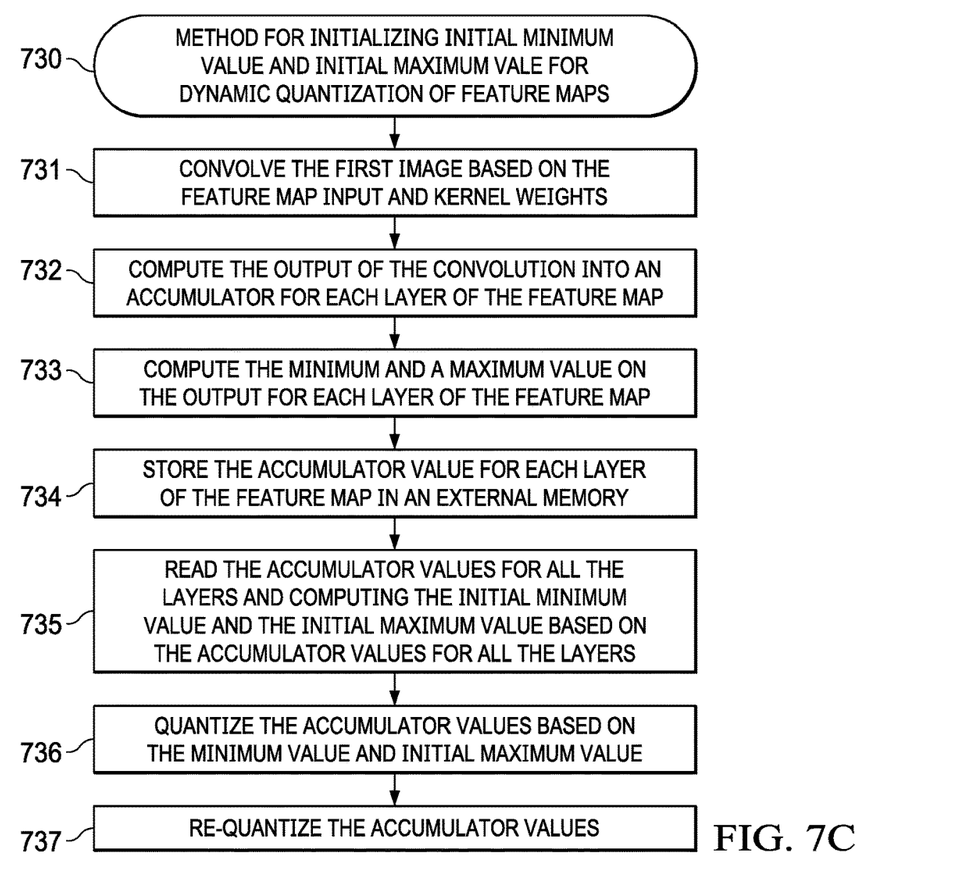
FIG. 7C is a flow chart illustrating a second technique for initializing the min value and max value according to one aspect of the present invention.

FIG. 7C (730) illustrates a second method of initializing the min value and the max value comprises several steps. The first step (731) in the method includes convolving the first image based on a feature map input and kernel weights. The method then proceeds to step (732) where it computes the output of the convolution into an accumulator for each layer of the feature map. Next, the method computes a min value and a max value on the output for each layer of the feature map (733). Following the computation, the method stores the accumulator value for each layer of the feature map in an external memory (734). Next, the method reads the accumulator values for all the layers and computes the initial min value and the initial max value based on the accumulator values for all the layers (735). The method in step (736) quantizes the accumulator values based on the minimum value and the maximum value. Finally, the method re-quantizes the accumulator value in step (737) followed by outputting the re-quantized value to an external memory.

The inference time during the first 2 seconds for the first frame may be high, but the system may stabilize upon updating the predicted min and predicted max value. The initialization values for min value and max value are as close to the real inference scenario as possible. During system boot up which is typically 4 times slower, instead of 30 ms the boot up might take 100 ms. A delay in computing for the first 100 ms may be realized, however after 100 ms the exemplary method of dynamic quantization as described in FIG. 9 enables the inference to be performed without substantial accuracy loss and without external memory access for quantization. According to a preferred embodiment accuracy loss due to the dynamic quantization is less than 0.1%.

Figure 7D:
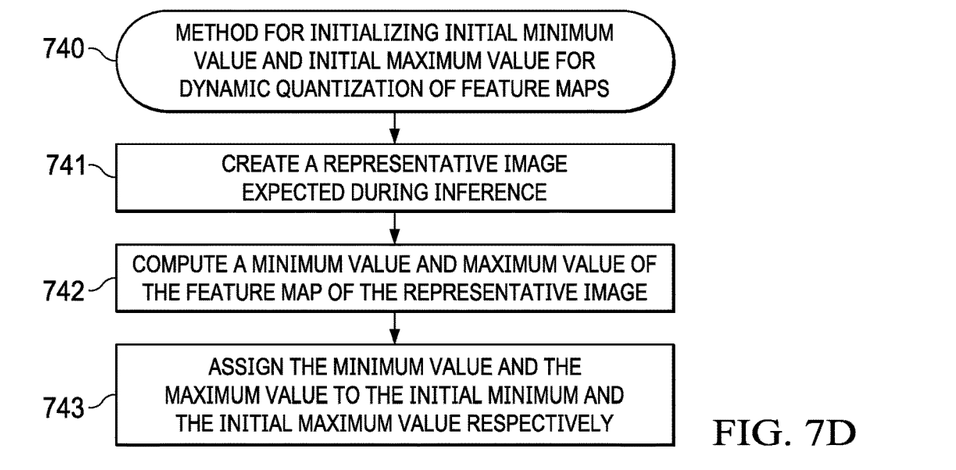
FIG. 7D is a flow chart illustrating a third technique for initializing the min value and max value according to one aspect of the present invention

FIG. 7D (740) illustrates a third method of initializing the min value and the max value comprises several steps. The first step in the method creates a representative image expected during inference (741). Next, the method computes a min value and max value of the feature map of the representative image sequence on host machine (PC) (742). Next, the method assigns the min value and the max value to the initial min value and the initial max value respectively (743).

A static representative image may be used to determine a min and max offline. The representative image may be generated with a camera that may be used for the inference. Similarly, the conditions of the representative image capture such time and day may also be similar to the inference conditions. The min value and max value may be stored in a memory along with the kernel weights after training. Similarly, if the inference is performed during night time, a representative image captured during a night time may be used for the training. A min and max may be computed from the training frame work.

Figure 8:
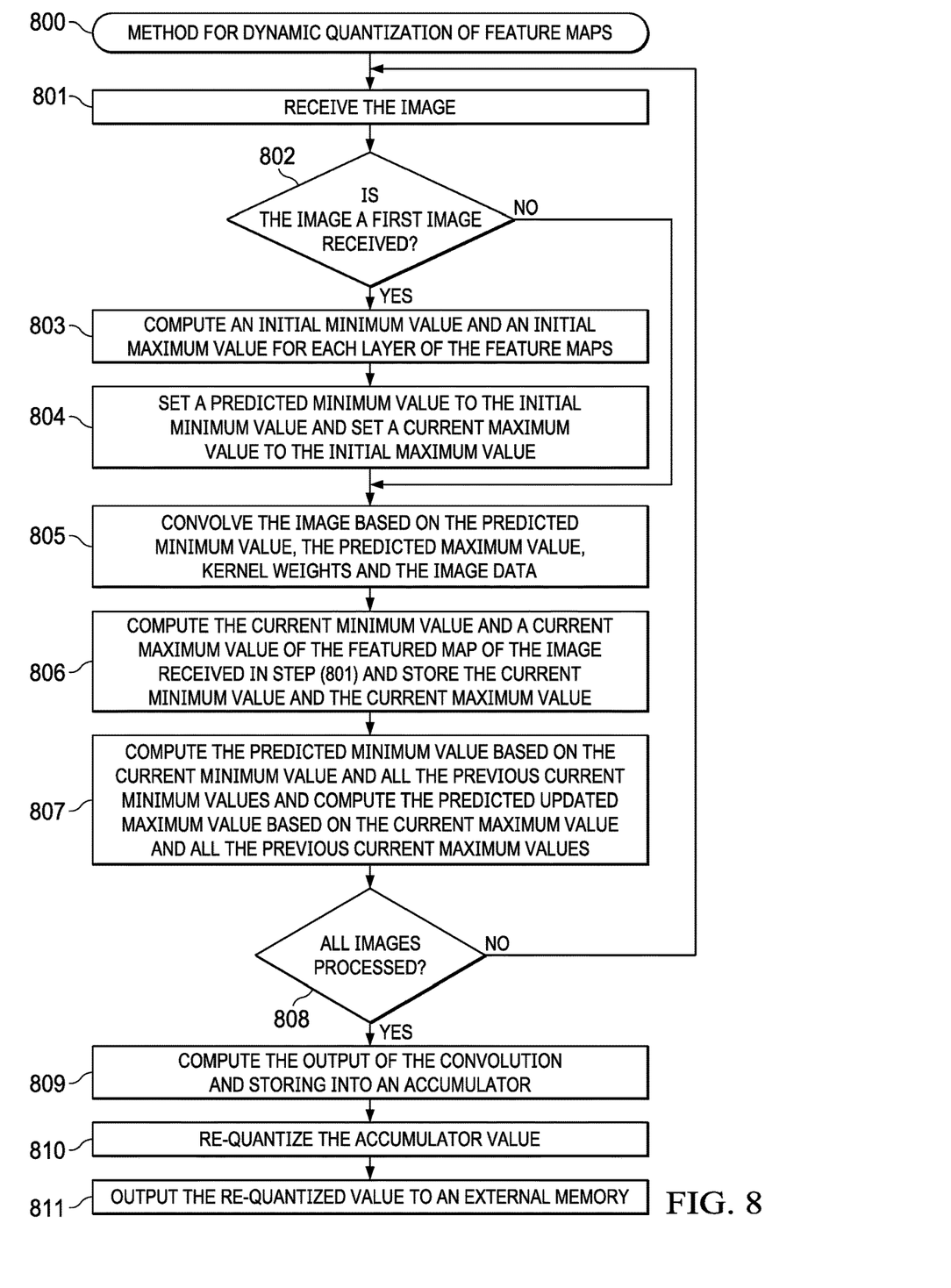
FIG. 8 illustrates pseudo code for updating range statistics for dynamic quantization according to one aspect of the present invention.

As generally seen in the flow chart of FIG. 8 (800), a preferred exemplary method for dynamic quantization of feature maps in an image may be generally described in terms of several steps. The first step in the method receives and processes an image (801). In the next step, the method determines if the image is the first image received (802), if so, the method computes an initial Min value and an initial Max value for each feature map (803) and sets a predicted Min Value to the initial Min Value and a predicted Max Value to the initial Max Value (804). If the image is not the first image received in step (802), the method in step (805) convolves the image based on the predicted Min value, the predicted Max Value, kernel weights and the image data. The method then computes a current Min Value and a current Max Value of the feature map of the image received in step (801) and stores the current Min Value and the current Max Value (806). Next, the method computes the predicted Min Value based on the current Min Value and all the previous current Min Values and computes the predicted updated Max Value based on the current Max Value and all the previous current Max Values (807), and repeats step (801) to step (805) until all images are received (808).

The dynamic quantization of feature maps in an image may be generally described in terms of the further steps. The first step computes the output of the convolution into an accumulator (809), the next step in the method re-quantizes the accumulator value (810); and the last step outputs the re-quantized value to an external memory (811).

Figure 9:
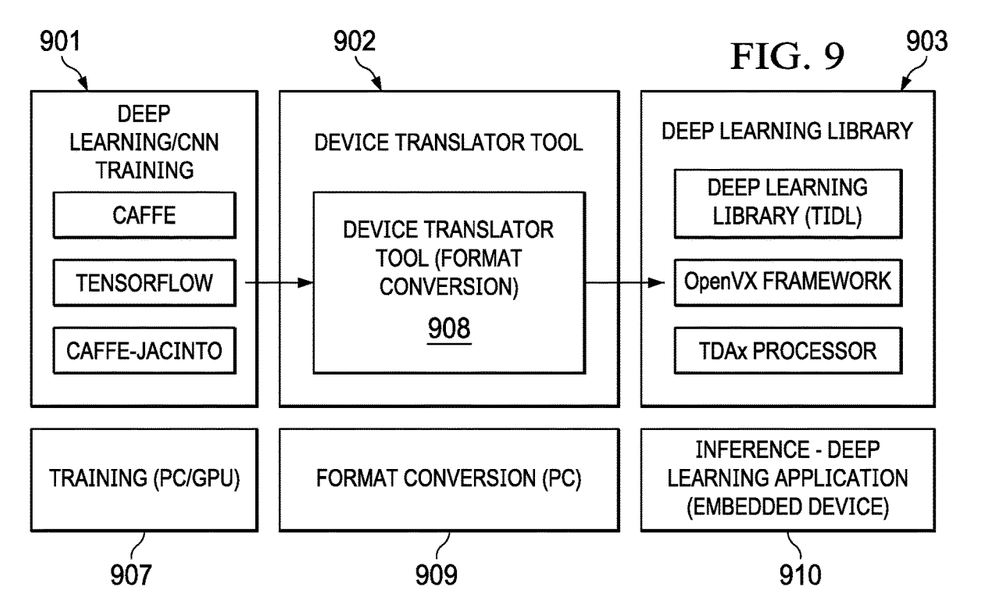
FIG. 9 illustrates an exemplary system for dynamic quantization, according to one aspect of the present invention.

FIG. 9 illustrates an exemplary system for dynamically quantizing feature maps using the method as described in FIG. 8. The system may include a training framework block (901), a device translator tool (902) having a format convertor (908) running on a format conversion computer (909) and a deep learning library (903). The training block may further comprise training frameworks such as Caffe, a tensor flow, and a caffe-jacinto which receive training data and perform floating point computations on CPU/GPU (907). A final model may be created from the training block and a device translator tool (902) may convert the model into a library format and store the library formatted model in a deep learning library (903). A deep learning application (910) on an embedded device may read in the library during inference of an image and detect elements and feature of the image with some exemplary dynamic quantization methods described in FIG. 8.

According to an exemplary embodiment, a system for dynamic quantization of feature maps in an image includes an image capture device, a training framework model, an inference block and a detection block; wherein each of the feature maps of an image captured by the image capture device is dynamically quantized in the inference block based on a predicted min value, predicted max value, and kernel weights from the training model; wherein further the detection block detects the image based on the quantization and inference in the inference block. According to another exemplary embodiment, the training framework model applies weights on the received image with kernel weights determined during a training process. According to another exemplary embodiment the predicted min value and the predicted max value is based on a formula applied on a previous min value and a previous max value respectively. According to yet another exemplary embodiment the inference block further computes a current min value and a current max value and updates the predicted min value and the predicted max value based on the a current min value and a current max value. According to another exemplary embodiment the predicted min value, the predicted max value are 32-bit integers and the kernel weights are 8-bit integers. According to further exemplary embodiment the output from the inference block is an 8-bit integer.

Figure 10:
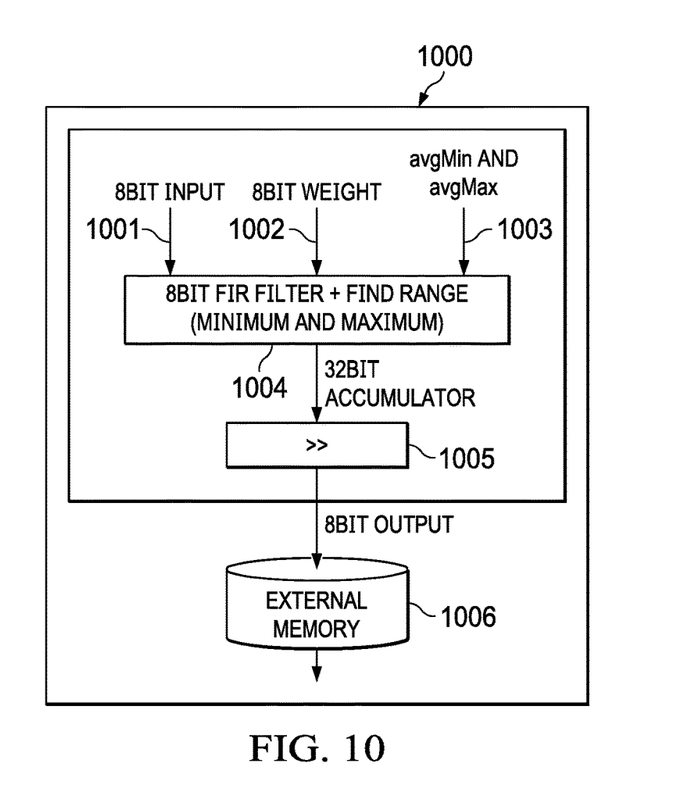
FIG. 10 illustrates an exemplary signal flow diagram for dynamic quantization, according to one aspect of the present invention.

FIG. 10 (1000) depicts an exemplary signal flow diagram for dynamic quantization of feature maps in an image with a shift operation during re-quantization. During an inference process, a convolution block (1004) receives an 8-bit input (1001) of the feature map, an 8-bit weight (1002) and a predicted min value and max value (1003) similar to FIG. 6 (600). The output (1005) may be stored in a 32-bit accumulator and into an external memory (1006). Instead of using a floating point division for converting 32-bit to 8-bit during re-quantization as described above in FIG. 6, a division operation with a right shift may be used according to one exemplary embodiment. The 32-bit max accumulator value could be any number for example, 16 k that needs to be mapped to an 8-bit number (255). Instead, right shift by a number N which could be 1, 2 . . . 10 which implies division by 2, 4, 8 etc. There would be a quantization loss due to the shift operation but the computation of a floating point operation is saved.

Table 1.0 below shows results of prediction (model versus real observation) based on a floating point model compared to the exemplary solution as aforementioned. As clearly shown, the mean of prediction percentage for either models is substantially the same. However, the proposed solution of dynamically quantizing the input with a predicted min value and a predicted max value prevents compute intensive floating point operations and reduces undesired external memory cycles while keeping the accuracy loss to an acceptable minimum.

Table 2.0 below shows results of cycles used for computing during inference for a power of 2 quantization versus a proposed exemplary embodiment. The results clearly indicate a substantially small increase (2%) in compute cycle for the exemplary solution. However, the accuracy loss and quantization loss are substantially reduced with the proposed exemplary embodiment without causing excessive external memory access.

TABLE 1.0

| Class Id | Floating point model | Proposed Solution (With 8-bit) |
|---|---|---|
| 0 | 97.04% | 97.06% |
| 1 | 93.04% | 93.08% |
| 2 | 68.55% | 68.64% |
| 3 | 65.07% | 64.35% |
| 4 | 88.13% | 88.15% |
| Mean | 82.36% | 82.25% |

TABLE 2.0

| Semantic Segmentation Network on - 1024 × 512 input | EVE (Mega Cycles) | C6x DSP (Mega Cycles) |
|---|---|---|
| Fixed Power of Two Quantization (prior art) | 162.06 | 554.5 |
| Exemplary embodiment | 165.76 | 579.03 |
| % of Additional Compute | 2.28% | 4.42% |

Method Summary

The present invention method for dynamic quantization of feature maps of an image in a deep neural network inference, wherein the method comprising the steps of:
 a) receiving and processing an image;
 b) if the image is the first image received, computing an initial Min value and an initial Max value for each feature map and setting a predicted Min Value to the initial Min Value and setting a predicted Max Value to the initial Max Value;
 c) convolving the image based on the predicted Min value, the predicted Max Value, kernel weights and the image data;
 d) computing a current Min Value and a current Max Value of the feature map of the image received in step (b) and storing the current Min Value and the current Max Value;
 e) computing the predicted Min Value based on the current Min Value and all previous current Min Values and computing the predicted updated Max Value based on the current Max Value and all previous current Max Values; and
 f) repeating step (c) to step (e) until all images are received.
The method further comprises the steps of:
 g) computing the output of the convolution and storing into an accumulator;
 h) re-quantizing the accumulator value; and
 i) outputting the re-quantized value to an external memory
This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:

One skilled in the art will recognize that other embodiments are possible based on combinations of elements taught within the above invention description.

An embodiment wherein the predicted min value, the predicted max value, current min value, current max value, initial min value and initial max value are floating point numbers.

An embodiment wherein the predicted min value, the predicted max value, current min value, current max value, initial min value and initial max value are fixed point numbers comprising bits ranging from 4 to 32.

An embodiment wherein the predicted min value, the predicted max value, current min value, current max value, initial min value and initial max value are fixed point 8 bit numbers.

An embodiment wherein the predicted min value, the predicted max value, current min value, current max value, initial min value and initial max value are signed integers.

An embodiment wherein the predicted min value, the predicted max value, current min value, current max value, initial min value and initial max value are unsigned integers.

An embodiment wherein the number of layers in each of the feature maps range from 1 to 10,000.

An embodiment wherein the Kernel weights are determined during a training sequence.

An embodiment wherein the predicted Min Value is computed based on an average of the previous Min Values and the predicted Max Value is computed based on an average of the previous max Values.

An embodiment wherein the predicted Min Value is computed based on a weighted average of the previous Min Values and the predicted Max Value is computed based on a weighted average of the previous max Values.

An embodiment wherein the predicted Min Value is computed based on a formula applied on the previous Min Values and the predicted Max Value is computed based on a formula applied on the previous max Values.

An embodiment wherein accuracy loss due to the dynamic quantization is less than 0.1%

An embodiment wherein the accumulator value is a 32-bit integer.

An embodiment wherein an output of the re-quantization step is an 8-bit integer.

An embodiment wherein the step of computing an initial Min value and an initial Max value for each layer further comprises the steps of:
  determine a quantization scaling factor based on a global min value and a global max value during training;
  assigning the global min value to the initial min value and the global max value to the initial max value;
  convolving the first image based on the feature map input and kernel weights;
  computing the output of the convolution into an accumulator;
  re-quantizing the accumulator value; and
  outputting the re-quantized value to an external memory.

An embodiment wherein the step of computing an initial Min value and an initial Max value for each layer further comprises the steps of:
  convolving the first image based on the feature map input and kernel weights;
  computing the output of the convolution into an accumulator for each layer of the feature map;
  computing a min value and a max value on the output for each layer of the feature map;
  storing the accumulator value for each layer of the feature map in an external memory;
  reading the accumulator values for all the layers and computing the initial min value and the initial max value based on the accumulator values for all the layers;
  quantizing the accumulator values based on the Initial min value and Initial max value; and
  re-quantized the accumulator values.

An embodiment wherein the step of computing an initial Min value and an initial Max value for each layer further comprises the steps of:
  creating a representative image expected during inference;
  computing a min value and max value of the feature map of the representative image on host machine (PC);
  assigning the min value and the max value to the initial min value and the initial max value respectively.

An embodiment wherein the re-quantization step further comprises converting the output of the accumulator with a division operation.

An embodiment wherein the re-quantization step (h) further comprises converting the output of the accumulator with a shift operation.

We claim:

1. A method comprising:
receiving, by at least one processor, an image;
in response to determining that the image is a first image, computing, by the at least one processor, a first min value and a first max value for a feature map of the image;
setting, by the at least one processor, a second min value to the first min value and setting a second max value to the first max value;
convolving, by the at least one processor, the image based on the second min value, the second max value, kernel weights, and the image;
computing, by the at least one processor, a third min value and a third max value of the feature map of the image;
updating, by the at least one processor, the third min value based on the third min value and previous third min values; and
updating, by the at least one processor, the third max value based on the third max value and previous third max values.

2. The method of claim 1, further comprising:
computing an output of the convolution;
storing the output of the convoluting in an accumulator;
re-quantizing an output of the accumulator; and
outputting the re-quantized output of the accumulator to an external memory.

3. The method of claim 2, wherein the output of the accumulator is a 32-bit integer.

4. The method of claim 2, wherein an output of the re-quantization step is an 8-bit integer.

5. The method of claim 2, wherein the re-quantization further comprises converting the output of the accumulator with a division operation.

6. The method of claim 2, wherein the re-quantization further comprises converting the output of the accumulator with a shift operation.

7. The method of claim 1, wherein the second min value, the second max value, the third min value, the third max value, the first min value, and the first max value are floating point numbers.

8. The method of claim 1, wherein the second min value, the second max value, the third min value, the third max value, the first min value, and the first max value are fixed point numbers between 4 bits and 32 bits.

9. The method of claim 1, wherein the second min value, the second max value, second min value, the second max value, the first min value, and the first max value are fixed point 8 bit numbers.

10. The method of claim 1, wherein the second min value, the second max value, the third min value, the third max value, the first min value and the first max value are signed integers.

11. The method of claim 1, wherein the second min value, the second max value, the third min value, the third max value, the first min value, and the first max value are unsigned integers.

12. The method of claim 1, wherein a number of layers in each of the feature maps is from 1 layer to 10,000 layers.

13. The method of claim 1, wherein the kernel weights are determined during a training sequence.

14. The method of claim 1, wherein the second min value is computed based on an average of the previous third min values and the second max value is computed based on an average of the previous third max values.

15. The method of claim 1, wherein the second min value is computed based on a weighted average of the previous second min values and the second max value is computed based on a weighted average of the previous second max values.

16. The method of claim 1, wherein the second min value is computed based on a formula applied on the previous second min values and the second max value is computed based on a formula applied on the previous second max values.

17. The method of claim 1, wherein accuracy loss due to dynamic quantization is less than 0.1%.

18. The method of claim 1, wherein the computing the first min value and the first max value for each layer further comprises:
   determining a quantization scaling factor based on a global min value and a global max value during training;
   assigning the global min value to the first min value and the global max value to the first max value;
   convolving the first image based on the feature map and the kernel weights;
   storing the output of the convolution in an accumulator;
   re-quantizing an output of the convolution from the accumulator; and
   outputting the re-quantized output of the convolution from the accumulator to an external memory.

19. The method of claim 1, wherein computing the first min value and the first max value for each layer further comprises:
   convolving the first image based on the feature map and the kernel weights;
   storing an output of the convolution in an accumulator for each layer of the feature map;
   computing a min value and a max value on the output of the convolution for each layer of the feature map;
   storing an output of the accumulator for each layer of the feature map in an external memory;
   reading the output of the accumulator for all the layers and computing the first min value and the initial first max value based on the output of the accumulator for all the layers;
   quantizing the output of the accumulator based on the first min value and the first max value; and
   re-quantizing the output of the accumulator.

20. The method of claim 1, wherein computing the first min value and the first max value for each layer further comprises:
   creating a representative image during inference;
   computing a min value and max value of a feature map of the representative image on a personal computer (PC);
   assigning the min value and the max value to the first min value and the first max value, respectively.

21. A system comprising:
   an image capture device configured to capture an image;
   a training framework model configured to generate kernel weights based on the image;
   an inference block configured to dynamically quantize feature maps of the image based on a min value, a max value, and the kernel weights, comprising:
      determining a quantization scaling factor based on a global min value and a global max value;
      assigning the global min value to the min value and the global max value to the max value;
      convolving the image based on the feature map of the image and the kernel weights;
      re-quantizing the convolved image; and
      outputting the re-quantized convolved image to an external memory; and
   a detection block configured to detect the image based on the quantized feature maps.

22. The system of claim 21, wherein the training framework model is configured to apply weights on the image with kernel weights determined during a training process.

23. The system of claim 21, wherein the min value and the max value are determined based on a formula applied on a previous min value and a previous max value, respectively.

24. The system of claim 21, wherein the inference block is further configured to compute a second min value and a second max value and update a third min value and a third max value based on the second min value and the second max value.

25. The system of claim 21, wherein the min value and the max value are 32 bits, and the kernel weights are 8-bit integers.

26. The system of claim 21, wherein the output from the inference block is an 8-bit integer.

* * * * *